Oct. 13, 1931.   W. C. FURNAS   1,826,929
MAGNETIC CLUTCH
Filed March 5, 1928   3 Sheets-Sheet 1
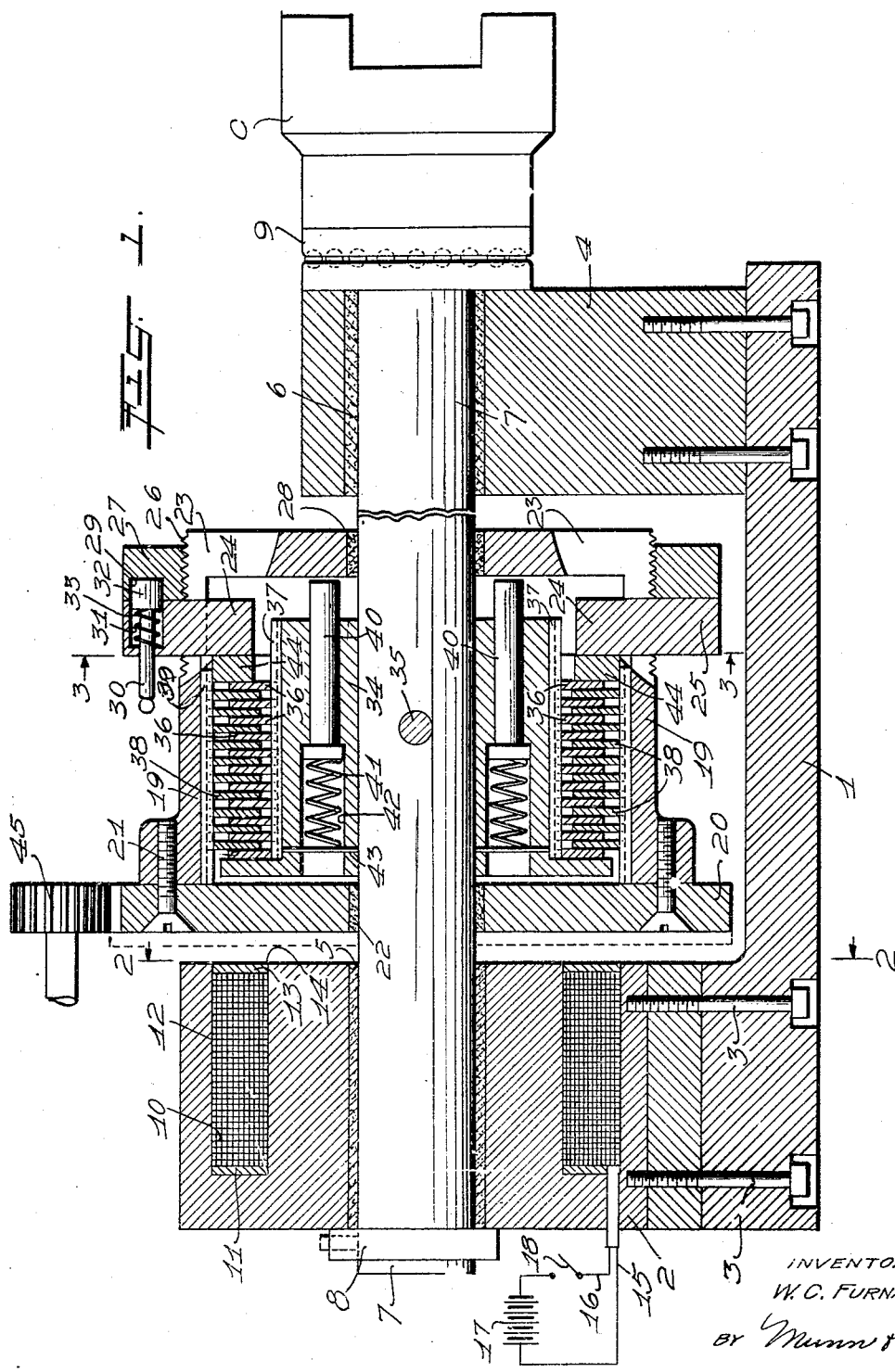
INVENTOR
W. C. FURNAS
BY Munn & Co.
ATTORNEYS Oct. 13, 1931.  W. C. FURNAS  1,826,929
MAGNETIC CLUTCH
Filed March 5, 1928  3 Sheets-Sheet 2
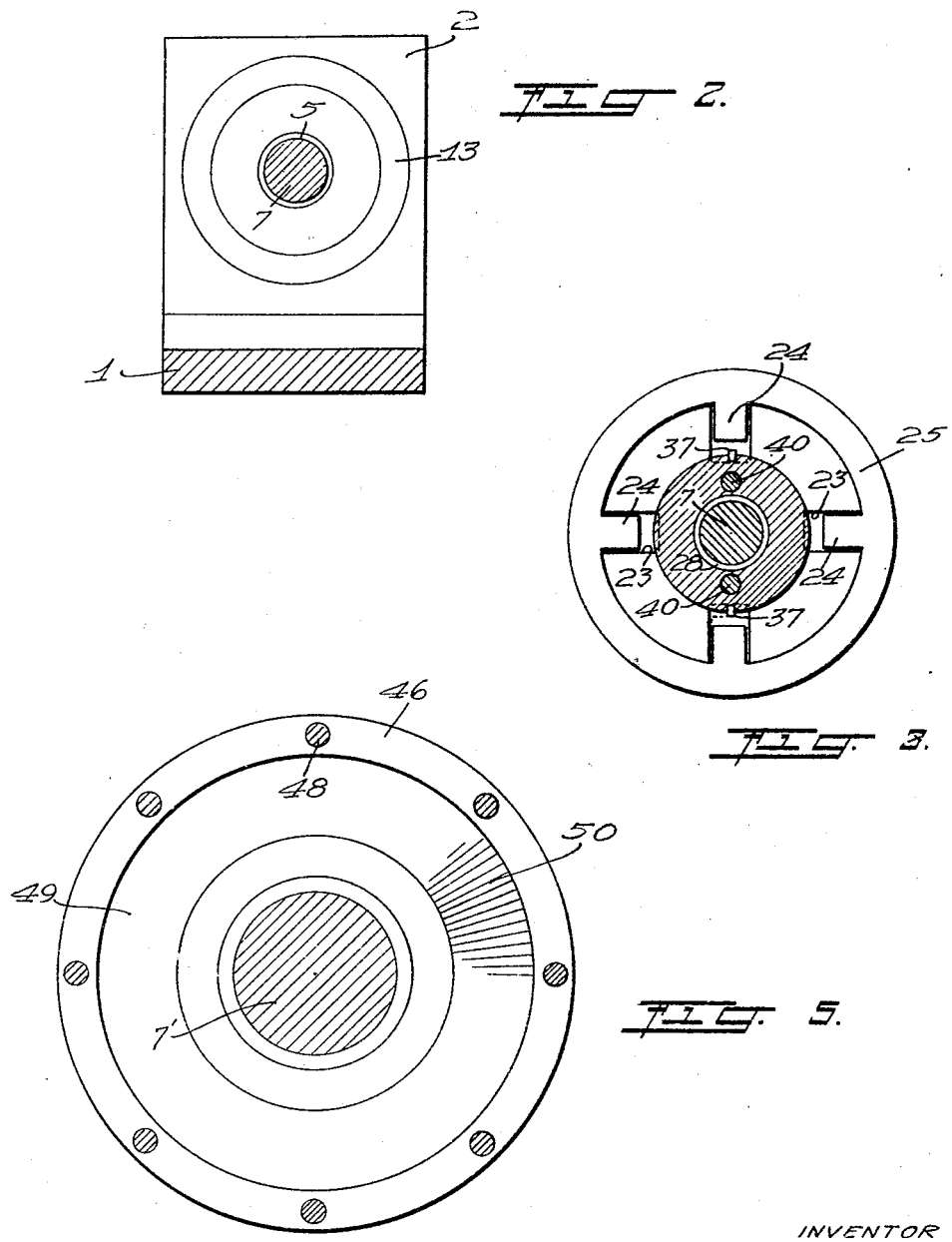
INVENTOR
W. C. FURNAS
BY Munn & Co.
ATTORNEYS

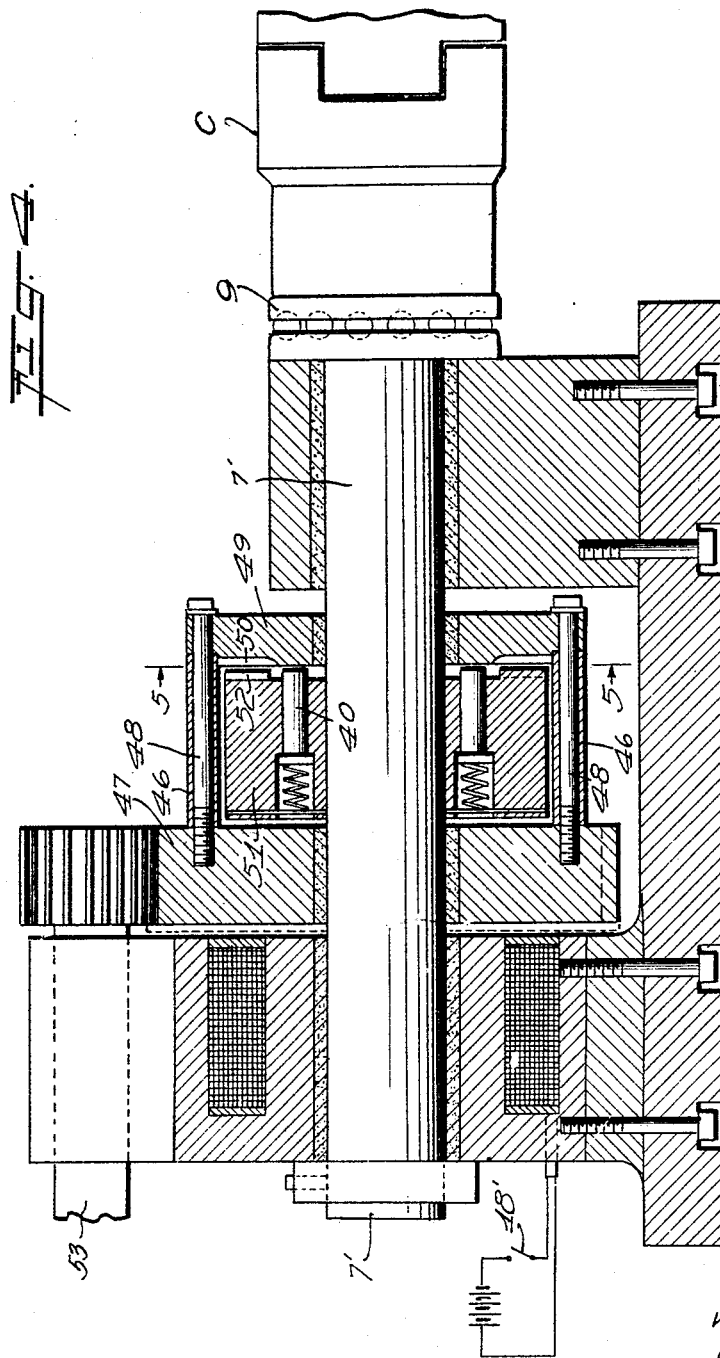

Patented Oct. 13, 1931

1,826,929

UNITED STATES PATENT OFFICE

WILLIAM C. FURNAS, OF WEST ALLIS, WISCONSIN

MAGNETIC CLUTCH

Application filed March 5, 1928. Serial No. 259,353.

My invention relates to improvements in magnetic clutches, and it consists in the combinations, constructions, and arrangements herein described and claimed.

An object of my invention is to provide a magnetic clutch in which there are no rotating electrical parts, thereby dispensing with collector rings, brushes, and the like.

A further object is to provide a magnetic clutch in which there are no exposed electrical parts, thereby providing a device which may be operated under water, oil, or the like.

A further object is to provide a magnetic clutch which is safe in that the electrical parts are sealed up, and a device which is durable in that there are relatively few parts.

Other objects and advantages will appear in the following specification, and the novel features of the invention will be particularly pointed out in the appended claims.

My invention is illustrated in the accompanying drawings, forming part of this application, in which Figure 1 is a longitudinal sectional view of my device, Figure 2 is a sectional view taken along the line 2—2 of Figure 1, Figure 3 is a sectional view taken along the line 3—3 of Figure 1, Figure 4 is a longitudinal sectional view of a modified form of my device, and Figure 5 is a detail view taken along the line 5—5 of Figure 4.

In carrying out my invention, I make use of a base 1 upon which a frame 2 is secured by means of bolts 3. A pillow block 4 is also secured to the base, as shown in Figure 1. The frame 2 and the pillow block 4 are provided with bearings 5 and 6, respectively. These bearings are disposed in axial alignment. A shaft 7 is disposed within the bearings and is supported against longitudinal movement by the provision of a collar 8 disposed adjacent the frame 2 and a thrust bearing 9 disposed adjacent the pillow block 4.

The frame 2 is provided with an annular recess 10. Referring to Figure 1, I have shown a collar 11 disposed within the recess and a coil 12 disposed adjacent the collar 11 and occupying substantially the entire space within the recess. A closure collar 13 is disposed within the recess and secured therein by clinching the edges 14 of the recess 10. Conductors 15 and 16 connect the coil 12 with a source of current, such as a battery 17. The current supply to the coil 12 may be cut off by actuating a switch 18, as shown in Figure 1.

A clutch pot 19 is mounted for rotation upon the shaft 7. A gear 20 is secured to the clutch pot 19 by means of suitable screws 21. The gear 20 is provided with a bearing 22 through which the shaft 7 is passed. The clutch pot 19 is provided with a plurality of slots 23 through which lugs 24 integral with a pressure ring 25 are passed. The clutch pot is threaded at 26 to receive a retaining nut or ring 27 which is threaded and disposed upon the threaded portion 26 of the clutch pot. The closed end of the clutch pot 19 is provided with a bearing 28. A plurality of openings 29 is provided in the nut 27. A locking pin 30 is supported within an opening 31 in the pressure ring 25. The locking pin 30 is provided with a head portion 32 which is moved into one of the openings 29 by reason of a spring 33 when the nut 27 is moved so as to bring one of the openings 29 into longitudinal alignment with the opening 31.

Referring to Figure 1, I have shown a clutch spider 34 disposed within the clutch pot 19 and firmly secured to the shaft 7 by means of a suitable pin 35. A plurality of bronze rings 36 is movably mounted upon the spider 34 by means of keys 37. The keys 37 prevent rotary movement of the rings 36 with respect to the spider 34, but permit longitudinal movement. The rings are spaced apart and a plurality of steel rings 38 is alternately disposed between the bronze rings 36 in the manner shown in Figure 1. The rings 38 are keyed within the clutch pot 19 by means of suitable keys 39. The rings 38 are keyed against rotary movement but are permitted to move longitudinally with respect to the longitudinal axis of the shaft 7 in the same manner as are the rings 36.

The clutch spider 34 carries releasing pins 40 which are normally disposed in the positions shown in Figure 1 by reason of the springs 41. The springs 41 are retained within openings 42 in the spider by means of pins 43. The outer ends of the pins 40 are disposed substantially in engagement with the closed end of the clutch pot 19. A ring 44 is disposed within the clutch pot 19 and between the lugs 24 and the rings 36 and 38. This ring is keyed against rotation by means of the keys 39 and may be moved inwardly in the direction of the rings 36 and 38 for binding the latter together when the pressure ring 25 is moved, as will be more fully explained later.

The clutch pot 19 and the gear 20 which is secured to the clutch pot rotate about the shaft 7 and are driven by any suitable means, such as a gear or pinion 45.

From the foregoing description of the various parts of the device, the operation thereof may be readily understood. Referring to Figure 1, it will be seen that the gear 20, the clutch pot 19, and the pressure ring 25 rotate about the longitudinal axis of the shaft 7 and independently thereof when in the full line position. At this time, the rings 38 are free to rotate independently of the rings 36. Let us assume now that the switch 18 is closed for the purpose of energizing the coil 12. When the coil 12 is energized, the frame 2 may be said to be converted into a magnet for attracting the gear 20 and the clutch pot 19. In other words, the gear 20 may be said to function as an armature. Movement of the gear 20 in the direction of the frame 2 will of course result in a relative movement of the clutch pot 19. Movement of the clutch pot 19 causes the pressure ring 25, that is to say, the lugs 24 to be moved inwardly against the ring 44, thereby binding the rings 36 and 38 together. When the lugs 24 are moved in the direction of the rings 36 and 38, the latter are bound between the ring 44 and the flange portion of the spider 34. At this time, the gear 20 has moved the clutch pot 19 so that the gear is disposed substantially in the dotted line position and is held in this position during the time that the switch 18 is closed.

When the clutch pot 19 is moved for bringing the rings 36 and 38 into frictional engagement, the pins 40 are depressed against the tension of the springs 41. When the current has been cut off from the coil 12 by opening the switch 18, the gear 20 and the clutch pot 19 will return to the full line position by reason of the pins 40 which are moved against the closed end of the clutch pot by reason of the springs 41. It will thus be seen that the pins 40 move the clutch pot 19 so that the rings 38 are freed from frictional engagement with respect to the rings 36.

The locking pin 30 permits the pressure ring 25 to be adjusted for securing the proper relationship between the two sets of rings. When making this adjustment, the pin 30 is pulled outwardly for removing the portion 32 from the opening 29 in the nut 27. The nut may then be rotated for adjustment and again made secure by releasing the pin 30, whereupon the portion 32 will pass into one of the openings 29.

It will be noted that when the switch 18 is closed for energizing the coil, the movement of the gear 20 and the clutch pot 19 will result in a force being exerted upon the shaft 7 in the direction of the frame 2 and parallel to the longitudinal axis of the shaft. The function of the thrust bearing 9 is to prevent longitudinal movement of the shaft 7.

In Figures 4 and 5, I have shown a modified form of my device. In this form of the device, the clutch pot consists of a ring 46 secured to a gear 47 by means of bolts 48. A clutch plate 49 having teeth 50 in one face thereof is secured to the ring 46 by the bolts 48. A clutch ring 51 is secured to the shaft 7'. The clutch ring 51 is provided with teeth 52 for engaging the teeth 50. The operation of my modified form is similar to that of my preferred form in that when the switch 18' is closed, the gear 47, together with the ring 46 and the clutch plate 49, is moved in the direction of the clutch ring 51 for bringing the teeth 50 into engagement with the teeth 52. Engagement of these teeth will of course lock the rotating gear 47 and the clutch plate 49 with respect to the clutch ring 51, thereby transmitting rotary motion from a shaft 53 to the shaft 7'. This form of the device is also provided with pins 40 for moving the movable element away from the clutch ring 51 which is secured to the shaft 7' when the switch 18' is opened. In both forms of the device, a coupling C is secured to the shafts 7 and 7'. The thrust bearing 9 is disposed between the coupling C and the pillow block 4.

It will be understood that power may be applied to the shaft 7 directly, and the gear 45 and the shaft to which it is secured operated through the medium of the clutch mechanism in the usual manner.

I claim:

1. A magnetic clutch comprising a frame having an annular recess in one face, an electric coil disposed within said recess and having one edge terminating relatively near the face in which said recess is provided, a normally stationary shaft, a clutch spider rigidly secured to said normally stationary shaft and having a flange on one end, a plurality of spaced-apart rings disposed upon said clutch spider, a clutch pot rotatably disposed upon said normally stationary shaft and arranged for longitudinal movement thereon, a plurality of spaced-apart rings operatively connected with said clutch pot and disposed alternately between said first named rings, said clutch pot being provided with a plurality of openings, a pressure ring disposed upon said clutch pot and having lugs projecting through said openings for moving the rings into frictional engagement when said clutch pot is moved in the direction of said frame, an adjusting nut disposed upon said clutch pot and arranged for moving said pressure ring, and a gear secured to said clutch pot and disposed relatively near that face of said frame having the recess therein and parallel thereto.

2. A magnetic clutch comprising a frame provided with an electric coil, a normally stationary shaft, a gear disposed upon said normally stationary shaft and disposed in close proximity to said frame, a clutch mechanism disposed upon said normally stationary shaft and upon that side of the gear opposite said frame, and means connected with said gear for operating said clutch mechanism, whereby said normally stationary shaft will be caused to rotate with the rotation of said gear when the latter is moved in the direction of the frame when said coil is energized.

3. A magnetic clutch comprising a frame provided with an electric coil having one edge terminating substantially flush with one side of the frame, a normally stationary shaft, a gear mounted for rotation upon said normally stationary shaft and disposed in close proximity to said frame, said gear being arranged to be moved longitudinally upon said shaft, a clutch mechanism having a portion secured to said shaft and the other portion secured to said gear and movable therewith, said last-named portion being arranged to be moved into operative engagement with said first-named portion when the gear is moved in the direction of the energized coil.

4. A magnetic clutch comprising a frame provided with an electric coil having one edge terminating substantially flush with one side of the frame, a normally stationary shaft, a gear mounted for rotation upon said normally stationary shaft and disposed in close proximity to said frame, said gear being arranged to be moved longitudinally upon said shaft, and a clutch mechanism having a portion secured to said shaft and the other portion secured to said gear and movable therewith, said last-named portion being arranged to be moved into operative engagement with said first-named portion when the gear is moved in the direction of the energized coil, said first-named portion being provided with means for disengaging said portions when the coil is de-energized.

5. A magnetic clutch comprising a frame provided with an energizable coil, a normally stationary shaft, a clutch mechanism mounted upon said shaft and having a portion secured thereto and a second portion loosely mounted thereon, a gear connected with said second portion and positioned relatively near one face of said frame, said second portion being movable together with said gear when the coil is energized for frictionally locking the two clutch portions together, and means carried by the second portion for adjusting the relationship between the first and second named portions.

6. A magnetic clutch comprising a base having a frame disposed thereon provided with an energizable coil, a bearing mounted upon said base, said frame being provided with a bearing arranged in alignment with said first-named bearing, a normally stationary shaft supported by said bearings, a clutch pot rotatably mounted upon said shaft and having a gear connected thereto and defining one end of the clutch pot, said gear being disposed in close proximity to the frame, a clutch unit disposed within said clutch pot and fixed upon said shaft, a companion clutch unit connected with said clutch pot and arranged to be moved into frictional relation with said first-named unit, and means carried by the clutch pot and projecting therein for adjusting the relationship between said clutch units.

7. A magnetic clutch comprising a base having a frame disposed thereon provided with an energizable coil, a bearing mounted upon said base, said frame being provided with a bearing arranged in alignment with said first-named bearing, a normally stationary shaft supported by said bearings, a clutch pot rotatably mounted upon said shaft and having a gear connected thereto and defining one end of the clutch pot, said gear being disposed in close proximity to the frame, a clutch unit disposed within said clutch pot and fixed upon said shaft, a companion clutch unit connected with said clutch pot and arranged to be moved into frictional relation with said first-named unit, means carried by the clutch pot and projecting therein for adjusting the relationship between said clutch units, and means for frictionally disconnecting said clutch units when the coil is de-energized.

8. A magnetic clutch comprising a frame provided with an energizable coil, a normally stationary shaft, a clutch unit fixed upon said shaft, a second clutch unit enclosing said first-named unit and rigidly connected with a gear rotatably mounted upon said shaft, said gear being disposed in close proximity to said frame and arranged to be moved in the direction of the latter when the coil is energized for bringing the second-named clutch unit in operative engagement with said first-named clutch unit, and spring-pressed means carried by said first-named clutch unit for moving the second-named clutch unit in an opposite direction when said coil is de-energized.

Signed at West Allis, in the county of Milwaukee and State of Wisconsin, this 27th day of February, A. D. 1928.

WILLIAM C. FURNAS.